No. 625,528. Patented May 23, 1899.
J. F. WINCHELL.
RUBBER TIRE EQUIPMENT FOR VEHICLE WHEELS.
(Application filed June 4, 1898.)
(No Model.)
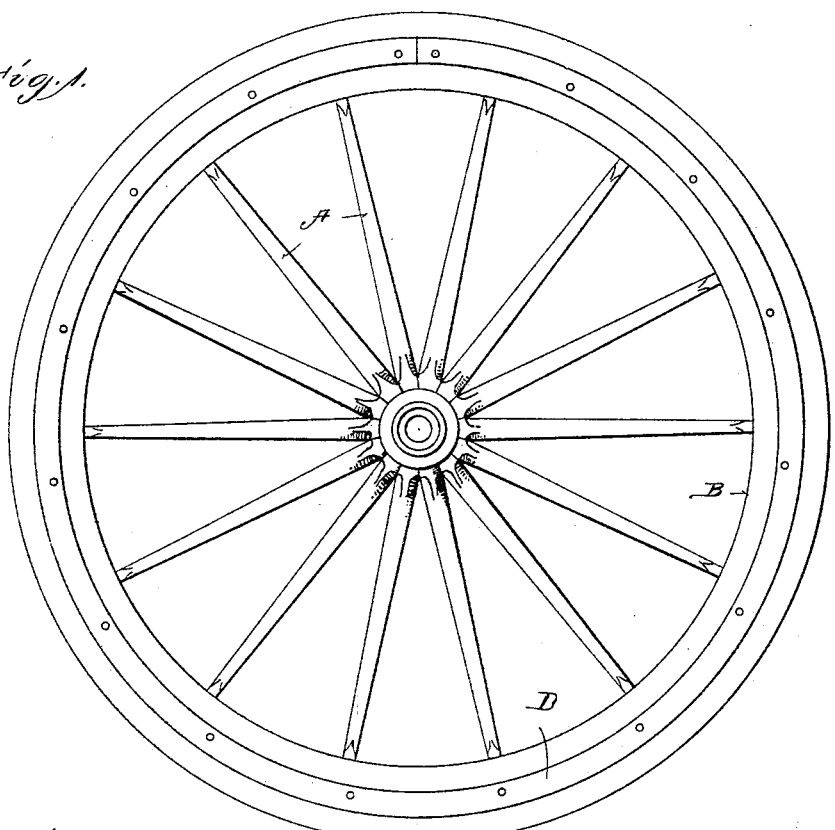
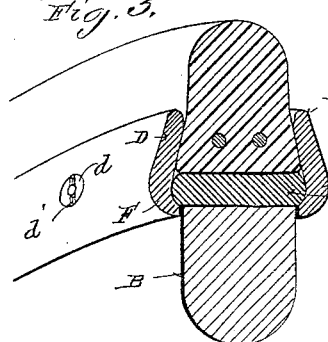
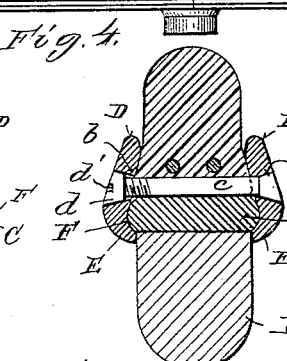
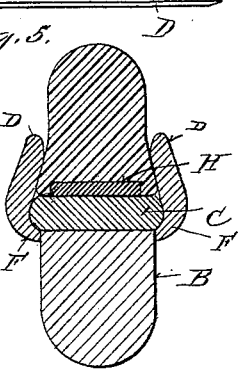
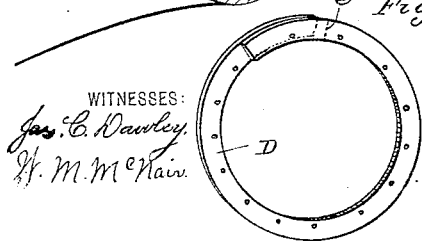
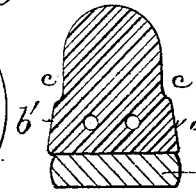
WITNESSES:
INVENTOR
James Frank Winchell
BY
ATTORNEY.

UNITED STATES PATENT OFFICE.

JAMES F. WINCHELL, OF SPRINGFIELD, OHIO.

RUBBER-TIRE EQUIPMENT FOR VEHICLE-WHEELS.

SPECIFICATION forming part of Letters Patent No. 625,528, dated May 23, 1899.

Application filed June 4, 1898. Serial No. 682,535. (No model.)

*To all whom it may concern:*

Be it known that I, JAMES F. WINCHELL, a citizen of the United States, residing at Springfield, in the county of Clark and State of Ohio, have invented certain new and useful Improvements in Rubber-Tire Equipments for Vehicle-Wheels, of which the following is a specification, reference being had therein to the accompanying drawings.

This invention relates to certain new and useful improvements in rubber-tire equipments for vehicle-wheels.

The object and purpose of my improvements are to provide practical and efficient appliances for equipping an ordinary vehicle-wheel, such as a carriage or buggy wheel with the usual wooden felly and a flat iron tire, with a rubber tire, these appliances being such that the attachment may be made by the users or owners of such vehicles or by hardware merchants or other persons outside of mechanics, so that my equipment can be carried in stock in retail establishments and the tires applied by the clerks of such establishments or by the customers themselves.

With these ends in view my invention consists of the combinations and constructions hereinafter fully described, and particularly pointed out in the claim.

In the accompanying drawings, on which like reference-letters indicate corresponding parts, and which form a part of this specification, Figure 1 is a side elevation of an ordinary carriage or buggy wheel with my tire equipment applied thereto; Fig. 2, a plan view of such wheel with such equipment; Fig. 3, an enlarged detail perspective view in cross-section of an ordinary wheel-rim, its flat iron tire, and my equipment attached; Fig. 4, a transverse sectional view of the same parts, showing a clamping-bolt; Fig. 5, a like view showing a modification of the rubber tire itself, in which is included a vulcanized strip harder than the general body of the tire; Fig. 6, a detail perspective view of one of the retaining-rings; Fig. 7, a detail cross-sectional view of the rubber tire before it is applied and a sectional view of the ordinary flat iron tire, the figure showing the relative normal sizes of the two parts.

The letter A designates a vehicle-wheel of the ordinary or any approved type—say a carriage or buggy wheel. This wheel has the usual rim or felly B and the usual flat iron or steel tire C, which is secured to it in the ordinary manner—say by tire-bolts. On this wheel I propose to mount and secure a rubber tire without removing the ordinary flat iron tire and without making additional holes in the wooden rim or felly. To this end my equipment consists of the following instrumentalities: a pair of annular or ring-like plates which for a short term I will call "rings." They are shown at D in the drawings. At intervals they are provided with holes, as shown, the holes in one ring being countersunk, as shown at $a$ in Fig. 4, and the holes in the other ring being also countersunk. The purpose of the countersunk holes shown at $a$ is to receive the tapering bolt-heads of the clamping-bolts $c$, while the purpose of the countersunk holes shown at $b$ is to receive the tapering nuts $d$ of these bolts. This form of nut fitting into such holes, together with expansive force of the rubber, effectually holds the nuts against working off the bolts. The rings are so fashioned in the rolls that produce them that they normally bend or flare inward, as shown, while their inner edges are turned somewhat to one side, as shown at E, to form a sort of annular hook or recess constituting a hook, (shown at F.) This turning of the rings to one side gives them the proper finish, while these annular recesses forming such hooks adapt them to fit upon the edges of the ordinary flat iron or steel tire C, on which latter the rings have a sort of pivotal action when they are being clamped and drawn toward each other, as will presently be described.

Referring to Fig. 7, it will be seen that the rubber tire is normally of slightly-greater width than the flat iron or steel tire.

Referring to Figs. 3, 4, and 5, it will be seen that the rubber has been reduced along its inner portion to a width substantially equal to that of the flat-iron tire. From this it will be understood that the rings D are engaged with the ordinary iron tire and then are drawn together, so as to compress and take a firm grip upon the rubber. This is done by means of clamps of any approved construction, but which of course form no part of this invention. After the rings are clamped against the rubber and brought to the position shown in Figs. 3, 4, and 5 the bolts $c$ are inserted, as shown in Fig. 4, and the nuts $d$ are screwed up, preferably by means of a screw-driver applied to the slot or recess $d'$ in the nut. The heads of the bolts and ends of the nuts are then filed off smooth and flush with the rings. The clamps are then removed and the expansive force of the rubber is exerted against the rings. The effect, as I have ascertained, is twofold—first, to force the rings outward so strongly that the bolts are put under severe tensile strain and the nuts are firmly bound, so that they cannot work off, and, second, to hold the rubber in the dovetailed groove thus formed by the two rings with such a grip that the rubber cannot become displaced. It must be understood also that this gripping action is exerted throughout the entire circumference of the rubber. The result is a quick and lasting mounting of the rubber on the ordinary flat iron tire.

The outer or exposed part of the rubber is not affected in respect to the matter of compression, and so is not solidified or hardened beyond its normal condition as determined by the composition and treatment employed in the factory production of the rubber tire.

In several of the figures I have illustrated longitudinal openings for the reception of wires G, which extend throughout the length of the rubber tire and at their ends are secured in any of the now several known ways. These retaining-wires may or may not be used in conjunction with my attaching equipment.

In Fig. 5 I have also shown, at H, a part or band-like section of the rubber tire designed to be vulcanized to the rest of the tire and of a different degree of hardness, being much harder or firmer than the tire generally. This portion is for the purpose of rendering the tire more solid or less yielding in that portion which is clamped by the rings D. This harder portion may or may not be used; but in some cases it would be preferred in practice.

From Fig. 6 it will be seen that the rings D are cut or open and that their ends stand some little distance apart, either by overlapping or not quite meeting. The latter is indicated by the dotted line $e$. The purpose of leaving the rings thus open is to enable them to be fitted to wheels which are a little less in circumference than the actual circumferential measurement of the rings themselves, so that one size of rings may be adjusted to several sizes of wheels, the surplus of the rings, if any, being filed or sawed off, so as to bring the ends of the rings in abutting position when they are finally fitted to the wheels. It will be further understood that as the rings are clamped against the sides of the rubber tire they have a slight pivotal movement against the edges of the flat iron tire, that the bolts are accommodated either by cutting the rubber away or by simply displacing as much rubber as the space they occupy, that the screwing up of the nuts on the bolts is an easy operation, since the clamping of the rubber and drawing of the rings to clamping position is accomplished by means of any suitable clamps placed at intervals around the wheel, and that as the space between the rings is dovetail in shape the clamping action of the rings forces the rubber tire constantly and firmly inward to its proper and desired place, so that such clamping action gives something additional in its practical effects to the gripping of the rubber merely.

Having thus fully described my invention, what I claim as new, and desire to secure by Letters Patent, is—

In a rubber-tire equipment, the combination with a pair of open rings, of a body of india-rubber composing a rubber tire, such rings having hook portions along their inside near their inner peripheries, and one of them having holes to receive bolts and their heads and the other holes to receive bolts and their nuts, said rings being adapted to pivot about an ordinary band-tire to clamp against the sides of said rubber tire and thus form a dovetailed clamping-seat for such tire, and bolts and nuts to hold the rings in such clamping relation to the rubber, the nuts on the bolts being held from unscrewing by the expansive action of the rubber.

In testimony whereof I affix my signature in presence of two witnesses.

JAMES F. WINCHELL.

Witnesses:
 W. M. McNAIR,
 P. A. SCHAEFER.